(12) United States Patent
Glebocki

(10) Patent No.: US 7,480,373 B2
(45) Date of Patent: Jan. 20, 2009

(54) GLOBAL TELEPHONY INTEGRATED SYSTEM, METHOD AND APPARATUS

(76) Inventor: Caesar Ian Glebocki, 1221 N. Dearborn St., Apt. 1403-S, Chicago, IL (US) 60610

( * ) Notice: Subject to any disclaimer, the term of this patent is extended or adjusted under 35 U.S.C. 154(b) by 1101 days.

(21) Appl. No.: 10/190,850

(22) Filed: Jul. 9, 2002

(65) Prior Publication Data

US 2003/0007626 A1    Jan. 9, 2003

Related U.S. Application Data

(63) Continuation of application No. 10/190,850, filed on Jul. 9, 2002.

(60) Provisional application No. 60/303,929, filed on Jul. 9, 2001.

(51) Int. Cl.
*H04M 3/42*    (2006.01)

(52) U.S. Cl. .......................... 379/201.01; 379/201.06; 379/201.07; 379/211.01; 379/221.14

(58) Field of Classification Search ............ 379/201.01, 379/201.06, 201.07, 211.01, 221.14
See application file for complete search history.

(56) References Cited

U.S. PATENT DOCUMENTS

| | | | | |
|---|---|---|---|---|
| 5,987,508 A | * | 11/1999 | Agraharam et al. | 709/217 |
| 6,477,242 B1 | * | 11/2002 | Freeny, Jr. | 379/93.24 |
| 6,580,790 B1 | * | 6/2003 | Henry et al. | 379/201.01 |
| 6,658,455 B1 | * | 12/2003 | Weinman, Jr. | 709/203 |
| 2002/0068599 A1 | * | 6/2002 | Rodriguez et al. | 455/550 |

* cited by examiner

*Primary Examiner*—Quynh H Nguyen

(57) ABSTRACT

The present invention provides a method for establishing a telecommunication connection. The method is accomplished by receiving the called party and the calling party plurality of identifying or dialing information, processing and storing identifying or dialing information in the active telephone directory, determining by data query analysis the called party and the calling party relations in the telecommunications networks, associating the relations with the networks routing information, generating dynamic calling number for the associated relations, processing and storing the dynamic calling number in the active telephone directory for routing in the telecommunication networks, and establishing a telephonic communication between the calling party and the called party using the active telephone directory dynamic calling numbers.

2 Claims, 5 Drawing Sheets

Figure 5

The Active Telephone Directory Algorithm

Processing a new node ($N_{new}$) joining the telephone network S,
- Online := true
- LT, $LT_t$, $LT_{new}$ := true
- LN, $LN_t$, $LN_{new}$ := true
- Allow Queries := true
- Add $Id^{new}$, add identifier for $N_{new}$ to graph S
- If $LT_{new} \cap LN \rightarrow LT = LN_{new}$, store list of semantically related neighbor nodes Processing the individual responses ($N_{response}$) from each node in $N_{random}$ for each received asynchronously updated $LT_{response}$ from randomly chosen nodes from the identifier space,
- Calculate $\alpha^{dist}$ := number of topics in $LT_{response} \cap LT_{new}$
- Add to $LN_{new}$ the list of nodes, distance, and the intersection set with $\beta_{direction}$ := true
- If received $N_{response}$ already exists in $LN_{new}$, select another set of nodes
- If $LT_{response} \cap LT_{new} = \emptyset$, store the information as a uni-directional set where $LN_{new}$ contains the list of nodes at $\alpha^{dist}$ = null and the intersection set with $\beta_{direction}$ = false Query processing at node $N_t$ at each $\alpha^{dist}$ in $LN_t \geq n$,
- If $LT_{query} \cap LN_{new} \rightarrow LT = \emptyset$, forward the query to all the neighbors in $LN_t$
- If $LT_{query} \cap LN_{new} \rightarrow LT = LT_{query}$, output the query and process the call

Notations for the Active Telephone Directory algorithm

| | |
|---|---|
| S | (Active Telephone Directory peer telecommunications network topology) |
| $N_t \in S_t$ | (Node '*t*' in graph S as a dynamic time dependent set) |
| $S(N_t, V_t)$ | (Set of nodes and Set of edges as a dynamic time dependent functions) |
| Id, LN, LT | (Node identifier, list of neighboring nodes, list of topics) |
| $LT_t$ | (List of topics published by the individual node time dependent) |
| $LN_t$ | (List of semantically related neighboring nodes time dependent) |
| $\alpha^{dist}$ | (Distance from the edge) |
| $\beta_{direction}$ | (Direction of the edge) |
| n | (Number of topics in $LT_{query}$) |
| $Id^{node}$ | (Identifier of node's topic) |
| $LT^{common}$ | (List of common semantic information) |
| $LT_{query}$ | (List of topics in the query) |

GLOBAL TELEPHONY INTEGRATED SYSTEM, METHOD AND APPARATUS

This a continuation of U.S. patent application Ser. No. 10/190,850, filed on Jul. 9, 2002, which claims the benefit of Ser. No. 60/303,929, filed on Jul. 9, 2001, the contents of which are expressly incorporated by reference herein in their entirety.

STATEMENT REGARDING FEDERALLY SPONSORED RESEARCH OR DEVELOPMENT

Not Applicable

TECHNICAL FIELD OF THE INVENTION

The present invention relates generally to the field of telecommunications and computer networks and, more particularly, to methods, systems and apparatuses for routing telephone calls in an SS7 circuit switching or packet switching telecommunications networks and the Internet.

BACKGROUND OF THE INVENTION

Most telecommunications networks are Signaling Systems 7 Networks (SS7). Traditionally, voice and data travelling on the networks would be in SS7 protocol from the originating subscriber (end node) in the network to the destination subscriber (end node) in the network. Implementation of Advanced Intelligent Network in SS7 provides enhanced capabilities to the telephone networks addressing the growing needs of telephone customers with unresolved problem of the telephone number shortage. Telecommunications based on the Internet Protocol (IP) are becoming widely acceptable. Abandonment and replacing the SS7 infrastructure would be costly. SS7 networks are reliable. Therefore, the solution is merging the SS7 with the IP based networks, particularly the Internet.

Current telephone directories' search techniques retrieve two-dimensional static information queried from flat databases. These technologies are based on one-to-one associations and link subscriber ⇔ telephone number, which fail to take into consideration dynamic and asynchronous variations in telephone directories contents, plurality of telephone directories, plurality of telephone numbers associated with a particular subscriber, devices mobility and subscribers interrelations. An important limitation of a traditional telephone directory search is that it queries a string "John Doe" but not a dynamic resource denoting a person. Moreover, a person may be attached to the plurality of communication devices and associated with the plurality of telephone numbers. Identifying a dynamic person on the plurality of dynamic telecommunications networks and determining the actively used telephone number in globally dispersed telephone directories is a problem.

U.S. Pat. No. 6,580,790 to Henry et al. teaches a system and method for providing a called party's telephone number in response to online communication data; however, Henry et al. does not teach the dynamic calling number stored in the active telephone directory system, nor does Henry teach the calling party and the called party names and the related profile data stored in the memory comprises dynamic calling number. Further, Henry et al. does not teach active telephone directory, nor does he teach the dynamic calling number being provided to the calling party or the called party.

While Rodriguez et al. U.S. Pat. Appl. 2002/0068599 teaches a system and method for providing a local telephone directory based on a mobile telephone location assigning dynamic speed dial keys to dynamic directory data when the mobile telephone moves from one mobile telephone area, such as cell, to another area, such prior Rodriguez's attempt have not provided a system and method for active self-managed telephone directories updating itself dynamically based on the interrelations between telephone services/subscribers and communications networks and a plurality of globally dispersed telephone services and directories databases. Rodriguez neither teaches dynamic interoperability between a plurality of globally disparate telecommunications systems nor a dynamic calling number routing within the active telephone directory system to interconnect semantically related by relationships subscribers.

Accordingly, it would be desirable to have a global subscriber-centric telecommunication system providing services for dynamically interrelated entities, connecting according to the relations and the latest known presence in the telecommunications networks.

SUMMARY OF THE INVENTION

The present invention provides a method for establishing a telecommunication connection. The method is accomplished by receiving the called party and the calling party plurality of identifying or dialing information, processing and storing identifying or dialing information in the active telephone directory, determining by data query analysis the called party and the calling party relations in the telecommunications networks, associating the relations with the networks routing information, generating dynamic calling number for the associated relations, processing and storing the dynamic calling number in the active telephone directory for routing in the telecommunication networks, and establishing a telephonic communication between the calling party and the called party using the active telephone directory dynamic calling numbers.

The present invention also provides an apparatus for setting up a dynamic telephone number generated by an active telephone directory for establishing a telecommunications connection. The apparatus include a data network server located on a data network connected to a data communications network and a memory device configured to devise a binary feature vectors representing the presence or absence of defined properties in response to a calling party query or received respective calling and called parties telecommunication transmission data, perform binary logical operations for obtaining similarity ranking between the query vectors and the corresponding feature vectors, measure a degree of coincidence, logic distance and semantic overlap of topics, classes and categories of the corresponding query vectors and feature vectors process and issue a dynamic calling number for the highest similarity ranked data, translate and associate into the telecommunications networks routing information the active telephone directory issued the dynamic calling number to route in a circuit switching or packet switching telecommunications and data networks to establish a telephonic communication between the calling party and called party.

Improvement for routing telephone calls in the telecommunications networks is described. The Active Telephone Directory preferred embodiments are nodes that are tied by relations in a decentralized dynamic peer-to-peer architecture. A computer system dynamically collects descriptive data about the subscribers and telecommunication services. Entities or subscribers to the global telecommunication networks are nodes. Ties are the dynamic interdependencies (relationships) between the nodes. Devices connected to the telecommunications networks are the subsets of the nodes. Telephone numbers are the subsets of the nodes. In order to establish a telephone communication, the query discovers the relations between nodes. The system determines the relationships between nodes and dynamically updates the subscribers' localization in relation to the active communication apparatus interface and the nodes in the networks to determine the telecommunication's pathway. The Active Telephone Directory then generates a dynamic calling number in parallel to the standard NPA-NXX-XXXX telephone number routing number. The application of the dynamic calling number in an Advanced Intelligent Networks (AIN) routes the calls to the closest of a plurality of branch or satellite offices based upon the last known subscribers' location in the telecommunications and computer networks.

BRIEF DESCRIPTION OF THE DRAWINGS

FIG. 5 is the Active Telephone Directory semantic search algorithm in accordance with the teaching of the present invention.

DETAILED DESCRIPTION OF THE INVENTION

Figure 1:
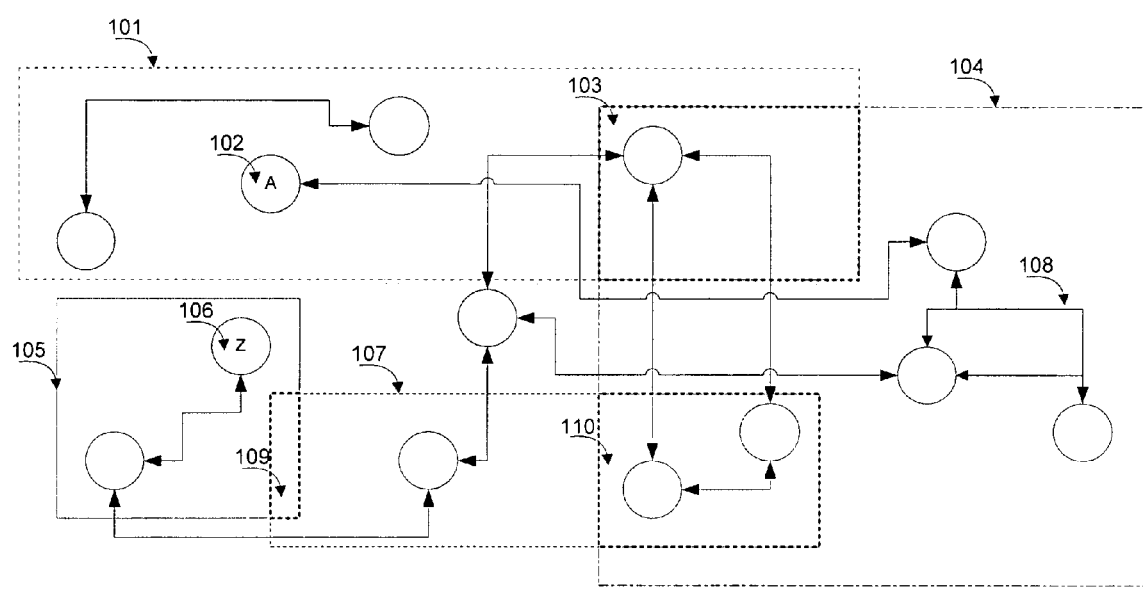
FIG. 1 is a schematic diagram of the network architecture in accordance with the teaching of the present invention.

Referring to FIG. 1, a schematic diagram of the network architecture of the present invention is shown. FIG. 1 shows telecommunications networks 101, 104, 105, and 107. The subscriber 102 is the telecommunications networks 101 node 102 and the subscriber 106 is the node of the telecommunications network 105. The information associated to nodes is given well-defined meaning. The information data on the networks is defined and linked in a way that it can be used for more efficient discovery, integration, and reuse in the system. In particular, the nodes provide resources corresponding to objects such as people, places, activities, or relations between the different types of resources. The telecommunications networks 101 and 105 are unrelated. Subscribers of the telecommunications networks 101 and 104 are related. Subscribers of the telecommunications networks 104 and 107 are related. Subscribers of the telecommunications networks 105 and 107 are related. Thus the nodes resources 103, 109, and 110 in the telecommunications networks 101, 104, 105, and 107 are shared and the networks are related. The neighboring, directly unrelated telecommunications nodes 102 of the telecommunications networks 101 and the telecommunications node 106 of the telecommunications network 105 are able to establish a telecommunications connection because of the structured, interrelated and shared machine interpretable resources between telecommunications networks.

In accordance with the teachings of the present invention illustrated in FIG. 1 various global telecommunication systems integrated into collaborative environments facilitate resource sharing between dynamic collections of participants. As a participant can act both as a resource provider and a resource consumer, a peer network is dynamically formed by collaborating disparate telephone networks. The telecommunication connection is facilitated by collaborating peers and locating semantically equivalent or related entities. Resources owned by individual participants are subject to asynchronous updates, with a requirement to propagate updates to the current resource consumers.

In the Active Telephone Directory preferred embodiments in FIG. 1 nodes are tied 108 by relations in a decentralized dynamic peer-to-peer architecture. A computer system dynamically collects descriptive data about the subscribers and telecommunication services. Entities or subscribers to the global telecommunication networks are nodes. Ties 108 are the dynamic interdependencies (relationships) between the nodes 102 and 106. Devices connected to the telecommunications networks are the subsets of the nodes. Telephone numbers are the subsets of the nodes. In order to establish telephone communication the query discovers the relation between nodes. The system determines the relationships between nodes and dynamically updates the subscribers' localization in relation to the active communication apparatus interface and the nodes in the networks to determine the telecommunication's pathway. The Active Telephone Directory then generates a Dynamic Calling Number in parallel to the standard NPA-NXX-XXXX telephone number routing number. The application of the Dynamic Calling Number in an Advanced Intelligent Networks (AIN) routes the calls to the closest of a plurality of branch or satellite offices based upon the last known subscribers' location in the telecommunications and computer networks.

Figure 2:
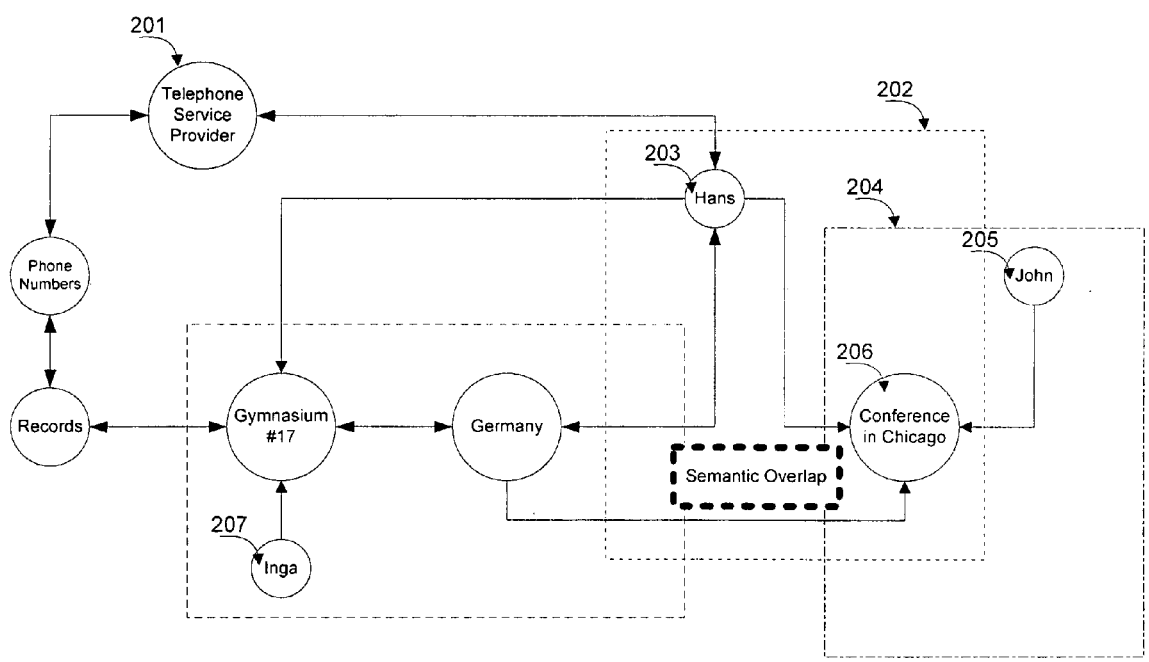
FIG. 2 is a schematic diagram illustrating in more detail the architecture of relations in accordance with the teaching of the present invention.

FIG. 2 is a schematic diagram illustrating in more detail the architecture of relations between resources denoting real world objects as people, places or events of this new global telephonic integrated system, method and apparatus. Different sources dynamically contribute data about a particular resource to the decentralized distributed Active Telephone Directory. Subscriber 205 localized in Chicago is attempting to establish a telephonic connection with subscriber 207 localized in Germany. The only information known to subscriber 205 is the subscriber 207 name, and that the subscriber 207 graduated a Gymnasium #17 in Germany. Subscriber 205 has no knowledge about subscriber's 207 currently used telephone number. In FIG. 2 we have resources corresponding to a resource "Inga," denoting a person. A subscriber 203 also graduated in Gymnasium #17 and is related to subscriber 207 by the graduation event in Gymnasium #17. The subscribers 203 and 205 are related through participation in conference 206 and are publishing their information to the Active Telephone Directory. Subscriber 207 is currently using telephone service provider 201. Subscribers 203 and 207 have information that is overlapping. Thus, subscriber 207's telephone number is available to the Active Telephone Directory. Therefore, subscriber 206's query is able to establish a telephone connection with subscriber 207.

In accordance with the teachings of the present invention illustrated in FIG. 2 the subscribers centric and device or telephone numbers independent telephone communication system architecture improvement is built on the Open Hypermedia model [1] and the concept of the Semantic Web [2]. The Active Telephone Directory semantic search-preferred embodiment contains machine-readable information about the resources, namely telephone subscribers (nodes). The embodiment associates machine-understandable annotations (metadata) with content. The metadata contains the telephone subscribers' information abstract, its role, and co-relating telephone subscribers' interrelationship information collected from the plurality of global telephone service providers and global telephone directories.

In the preferred embodiment of the present invention illustrated in FIG. 2, the telephone subscriber's hypermedia link information is stored separately from the telephone record that it describes. The links are stored in the Active Telephone Directory links databases. The links are managed and maintained separately from the telephone record databases containing the subscriber data. The directories' content is updated continually by a set of collaborating telecommunication nodes, where each node can dynamically update its content by publishing in the Active Telephone Directory.

Figure 3:
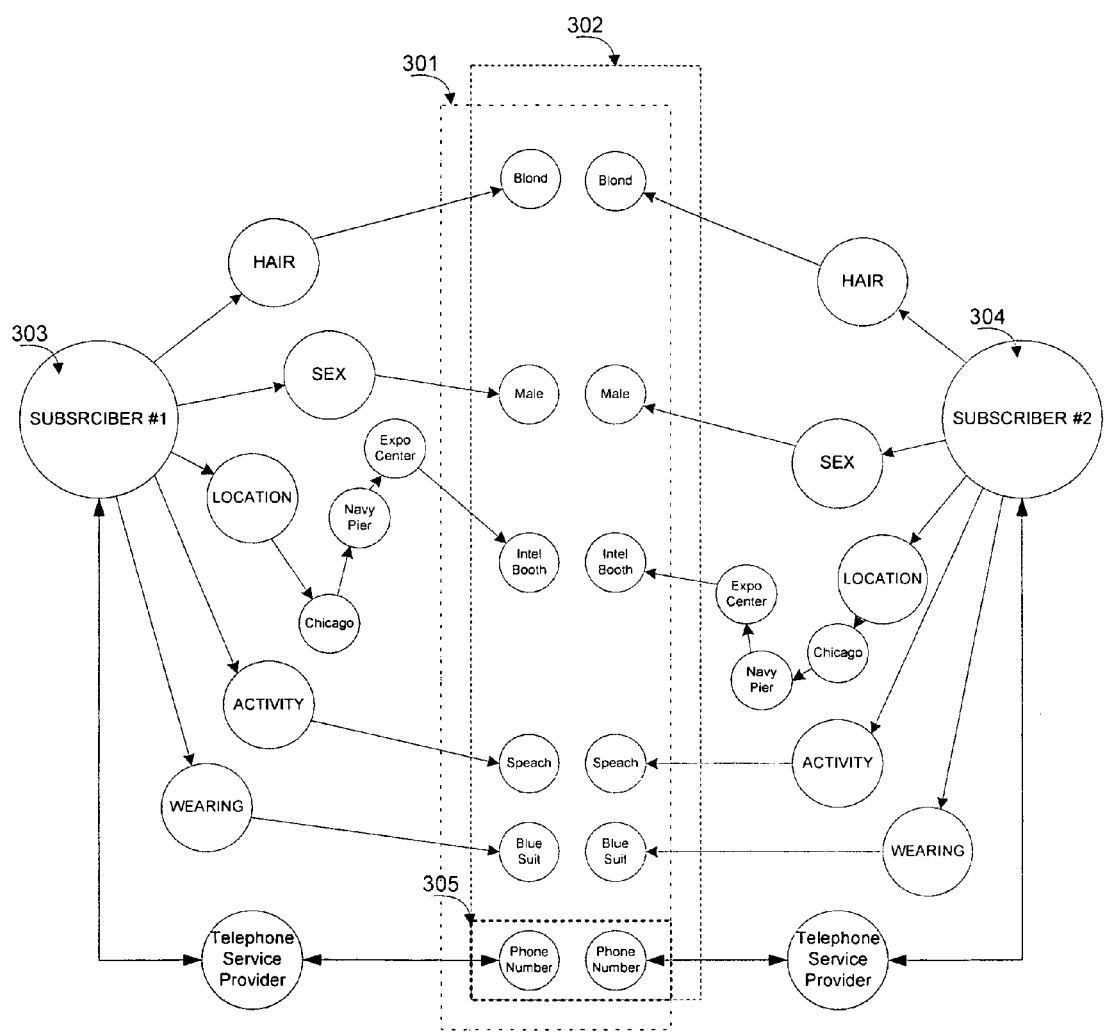
FIG. 3 is a schematic diagram of exemplary embodiment of the current invention.

FIG. 3 is a schematic diagram of exemplar embodiment of the current invention for casual meetings or dating through establishing a telephonic communication between unknown parties. The Active Telephone Directory contains rich machine-readable, -understandable and interpretable information about the resources, hereby with data modeled as a directed-labeled graph, wherein each node corresponds to a resource and each arc is labeled with a property type (resource). The subscriber 304 provides the Active Telephone Directory search engine with a phrase denoting an object (a subscriber 305) which the subscriber 304 employs to establish a telephonic communication. There is no particular information that the subscriber 304 knows about subscriber 303. Rather, subscriber 304 observing subscriber 303 is providing the search embodiment with a number of descriptors about subscriber 303. Subscribers 303 and 304 previously published dynamic identifying information to the Active Telephone Directory. Query processing unveils the subscriber 303 data 301 overlap the subscriber 304 data 302 and the interrelated data also overlap shared data 306. The Active Telephone Directory's rich set of links describing resources and their relations generates the Dynamic Calling Number processed to establish a connection command signal to establish a telephonic communication between subscribers 303 and 304.

The preferred embodiment of the present invention illustrated in FIG. 3 allows the inspection of the peers by the resource type and relations, returning the information about the occurrences of these types. The peer-to-peer networks service discovery techniques is generating a unique identifier for the resource, in this case a subscriber's telecommunication service node properties and related parameters. The information about the occurrences of services is then associated with the uniqueness of the search key.

In accordance with the teaching of the present invention, the employed semantic search maintains the relationships between the subscribers' resources (link databases). The immediate neighboring nodes share the relationship and are monitoring the connectivity with the neighboring nodes. The system of the present invention dynamically updates the Active Telephone Directory Dynamic Calling Number.

Figure 4:
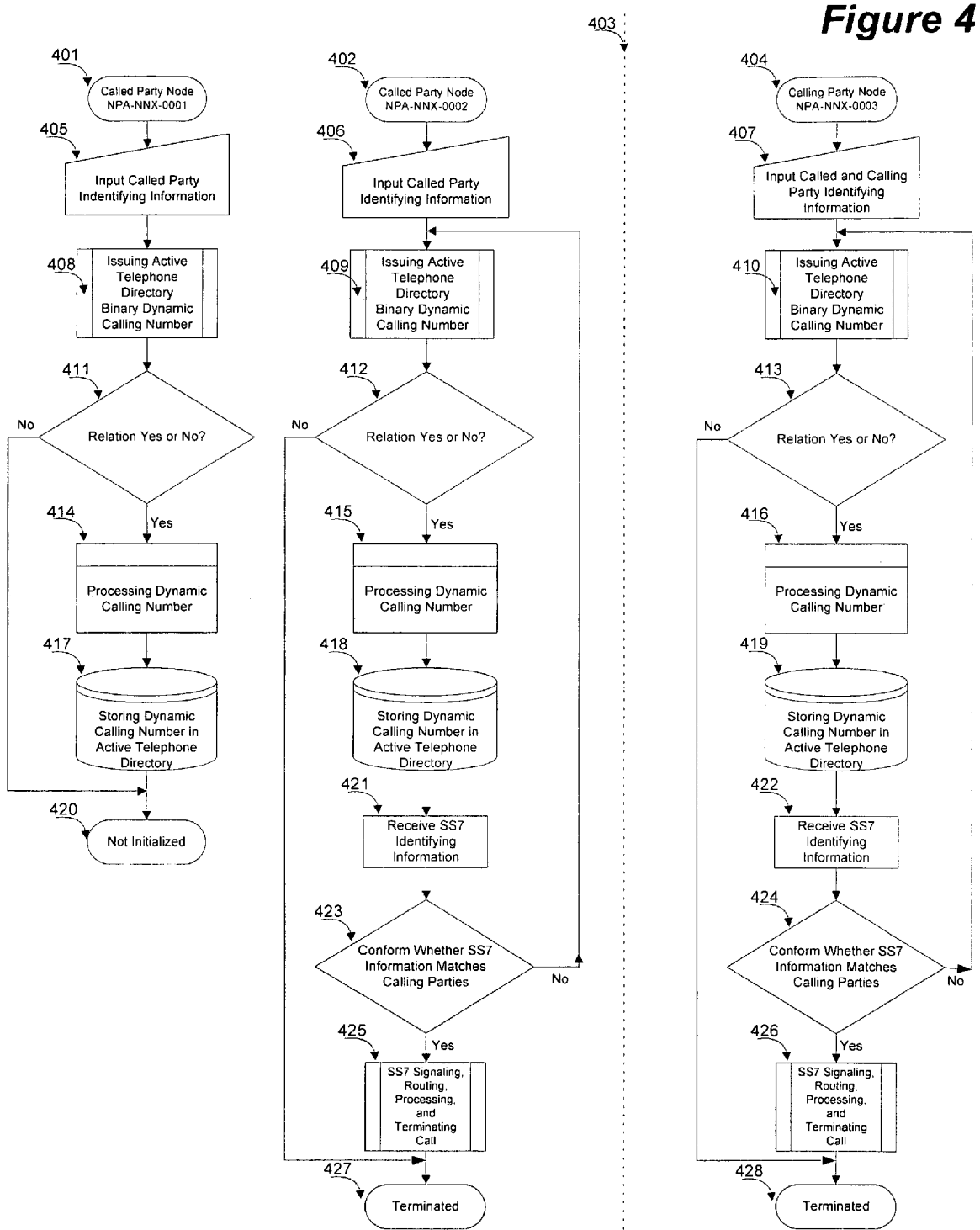
FIG. 4 is a flow diagram representing the Active Telephone Directory method for Dynamic Calling Numbers in accordance with the teaching of the present invention.

Referring now to FIG. 4, a flow diagram representing the Active Telephone Directory method for Dynamic Calling Numbers in establishing a telephonic connection is shown. The method is accomplished by receiving the called party 401 and 402, and the calling party 404 plurality of 405, 406, and 407 identifying or dialing information, processing 408, 409, and 410 and storing 417, 418, and 419 identifying or dialing information in the Active Telephone Directory, determining 417, 418, and 419 by data-query analysis the called party and the calling party relations in the telecommunications networks, associating the relations with the networks routing information, generating dynamic calling number for the associated relations 414, 415, and 416, processing 421 and 422, and storing the Dynamic Calling Number in the Active Telephone Directory for routing 423 and 424 in the telecommunication networks, and establishing 425 and 426 a telephonic communication between the calling party and the called party using the Active Telephone Directory Dynamic Calling Numbers.

FIG. 5 is the Active Telephone Directory exemplar semantic search algorithm. The method and apparatus of the present invention can be embodied as a computer program on a computer-readable medium as a random combination of entities and the computational relationships between them (links databases). The relationships between resources of the telecommunication nodes (telephone subscribers) are dynamically maintained. In this collaborative environment, the arrival of a node in a telecommunications network dynamically modifies the relationship with its neighbors as more potentially discoverable resources are added to the network. In this dynamic set the departure of a node invalidates its relationship with neighboring nodes. The update is not limited to the node storing the discovery information of the resources, but to all the nodes that are semantically connected to the arriving or departing node.

As shown in FIG. 5 in accordance with the teachings of the present invention the Active Telephone Directory algorithm represented by graph S is containing a list of dynamic nodes $N_t$ (telecommunications subscribers in a peer-to-peer network topology). Every node is uniquely identified by an identifier to route messages to individual nodes in a process of establishing telephone telecommunications connection. Each node $N_t$ dynamically publishes a list of topics $LT_t$, with information related to the telephone subscriber representing a node. The list of topics can be asynchronously dynamically updated by individual nodes. Each node maintains a list of neighboring nodes that hold semantically equivalent or related topics to facilitate entity-based clustering.

When a new node $N_{new}$ joins the telephone communications network S, it contacts a set of randomly preselected nodes represented in graph S by a set $N_{random}$. Node $N_{new}$ exchanges the list of topics $LT_{new}$ with each of the randomly selected nodes ($N_{random}$) to form an information overlap between $N_{new}$ and the nodes in set $N_{random}$, and available to individual nodes. This procedure is performed on each node in set $N_{random}$, leading to the creation of clustered information overlay. Connecting nodes enables to determine the semantic distance to other node by expressed distance as the $\alpha^{dist}$. For nodes with no semantic relationship the information is stored as $\alpha^{dist}$:=null. The semantic query calculates the distance between the query expression and cached information held on individual node $LT_t$. If the processor finds a match it routes the query result to the stored list of nodes' identifiers $Id^{node}$. The query is then compared to each of the recipient nodes.

In accordance with the teaching of present invention, the distance between nodes is measured as the amount of overlap between nodes topics lists. The query performs a semantic search of this information. It evaluates the initiating node cached information to determine the distance between the query expression and the cached information about the neighboring nodes. In cases with no overlap between the query result and the cached information, and where the query was propagated to all the neighbors of the recipient nodes and produced set with no elements, the query is terminated. Otherwise, the Active Telephone Directory Dynamic Calling Number establishes the telephonic connection.

I claim:

1. A tangible computer memory device that stores instructions that are executable by a computer system to implement a method of a dynamic telephone number being provided by an active telephone directory for establishing a telecommunications connection, the method comprising the steps of:

receiving, validating, translating and storing a plurality of calling and called parties telecommunication transmission data; devising binary representation of said stored data as respective feature vectors representing the presence or absence of defined properties in each of said calling and called parties telecommunication transmission data in response to the calling and called party plurality of input data or query;

generating a query vector based on said calling party query;

said plurality of input data or query not limited to text, sound, static or moving images;

performing binary logical operations between said query vector and said feature vector to obtain a definable similarity ranking for respective 1's representing how often a certain feature or a set of features in said query vector occurs within said corresponding feature vector;

said similarity ranking measures the degree of coincidence between the corresponding elements of said query vector and said feature vector, measures logic distance between said query vectors elements and the corresponding said feature vectors elements and measures semantic overlap discerning a meaningful links between said vectors elements in relations to topics, classes and categories;

said topics, classes and categories are not limited to said calling party and called party names, locations and phone numbers and are containing a plurality of interrelated socioeconomic, behavioral, demographic or other data; returning the results of said similarity ranking data;

retrieving the highest similarity ranked data and dynamically updating said calling and called party telecommunication transmission data;

processing and issuing the dynamic calling number for said highest similarity ranked said calling and called parties being nodes identified within circuit switching or packet switching telecommunications networks;

translating stored list of said telecommunication nodes identifiers comprising identifying information describing dynamic relations and conditions between said calling and called parties in said telecommunications and data networks circuit switching or packet switching into the telecommunication networks routing information;

generating the dynamic calling number and associating said dynamic calling number stored in said active telephone director with said telecommunications networks routing information; and routing said dynamic calling number by said telecommunication networks to establish a telephonic communication between the calling party and called party using the dynamic telephone number provided to the telecommunication routers by the active telephone directory.

2. An apparatus for setting up a dynamic telephone number generated by an active telephone directory for establishing a telecommunications connection comprising:

a data network server located on a data network, connected to a data communications network and a memory device configured to:

devise a binary feature vectors representing the presence or absence of defined properties in a respective telecommunication transmission data in response to received, validated and translated a stored plurality of calling and called party said telecommunications transmission data;

generate a query vector based on a calling party query;

measure a degree of coincidence, logic distance and semantic overlap of topics, classes and categories of the corresponding said query vectors and feature vectors;

perform binary logical operations on said query vectors and said feature vectors for obtaining a similarity ranking between said query vector and a corresponding said feature vector and returning results of said similarity ranking;

dynamically update and store of said calling and called party telecommunication transmission data based on retrieved the highest similarity ranked data;

process and issue the dynamic calling number for said highest similarity ranked said calling and called parties circuit switching or packet switching telecommunications networks identified nodes;

translate into the telecommunication networks routing information a list of said telecommunication nodes identifiers containing identifying information describing dynamic relations and conditions between said calling and called parties in said telecommunications and data networks circuit switching or packet switching;

generate and associate by said active telephone directory said dynamic calling number with said telecommunications networks routing information; and route said dynamic calling number by said telecommunications networks in establishing a telephonic communication between the calling party and called party using the dynamic telephone number provided to the telecommunications routers by the active telephone directory.

* * * * *